(12) United States Patent
Thiesson et al.

(10) Patent No.: US 8,504,491 B2
(45) Date of Patent: Aug. 6, 2013

(54) VARIATIONAL EM ALGORITHM FOR MIXTURE MODELING WITH COMPONENT-DEPENDENT PARTITIONS

(75) Inventors: Bo Thiesson, Woodinville, WA (US); Chong Wang, Princeton, NJ (US)

(73) Assignee: Microsoft Corporation, Redmond, WA (US)

(*) Notice: Subject to any disclaimer, the term of this patent is extended or adjusted under 35 U.S.C. 154(b) by 466 days.

(21) Appl. No.: 12/787,308

(22) Filed: May 25, 2010

(65) Prior Publication Data

US 2011/0295567 A1 Dec. 1, 2011

(51) Int. Cl.
*G06F 15/18* (2006.01)
*G06K 9/62* (2006.01)

(52) U.S. Cl.
CPC .................... *G06K 9/6226* (2013.01)
USPC ........................................... 706/12

(58) Field of Classification Search
USPC .............................. 706/12, 45, 62
See application file for complete search history.

(56) References Cited

U.S. PATENT DOCUMENTS

| 7,174,344 | B2 | 2/2007 | Campos | |
|---|---|---|---|---|
| 2003/0154181 | A1 | 8/2003 | Liu | |
| 2004/0189691 | A1* | 9/2004 | Jojic et al. | 345/720 |
| 2007/0242863 | A1 | 10/2007 | Hoppel | |
| 2008/0059174 | A1* | 3/2008 | Hershey et al. | 704/240 |
| 2011/0119212 | A1* | 5/2011 | De Bruin et al. | 706/12 |

OTHER PUBLICATIONS

Petrushin; Hidden Markov Models: Fundamentals and Applications Part 1: Markov Chains and Mixture Models; Online Symposium for Electronics Engineer 2000; http://www.techonline.com/osee/.

Honda et al.; Regularized Linear Fuzzy Clustering and Probabilistic PCA Mixture Models; IEEE Transactions on Fuzzy Systems, vol. 13, No. 4, Aug. 2005.

Law et al.; Simultaneous Feature Selection and Clustering Using Mixture Models; IEEE Sep. 2004 (vol. 26 No. 9) pp. 1154-1166.

Cong et al.; Semi-Supervised Text Classification Using Partitioned EM; Lecture Notes in Computer Science, 2004, vol. 2973/2004, 229-239.

Verbeek et al.; Greedy Gaussian Mixture for Texture Segmentation; 2001, ICANN'01, Workshop on Kernel and Subspace Methods for Computer Vision, p. 37-47.

Biernacki et al.; Choosing starting values for the EM algorithm for getting the highest likelihood in multivariate Gaussian mixture; Computational Statistics & Data Analysis archive; vol. 41 Issue 3-4, Jan. 28, 2003.

Roberts et al.; Maximum Certainty Data Partitioning; Pattern Recognition, vol. 33, No. 5. (1999), pp. 833-839.

(Continued)

*Primary Examiner* — David Vincent (57) ABSTRACT

Described are variational Expectation Maximization (EM) embodiments for learning a mixture model using component-dependent data partitions, where the E-step is sub-linear in sample size while the algorithm still maintains provable convergence guarantees. Component-dependent data partitions into blocks of data items are constructed according to a hierarchical data structure comprised of nodes, where each node corresponds to one of the blocks and stores statistics computed from the data items in the corresponding block. A modified variational EM algorithm computes the mixture model from initial component-dependent data partitions and a variational R-step updates the partitions. This process is repeated until convergence. Component membership probabilities computed in the E-step are constrained such that all data items belonging to a particular block in a particular component-dependent partition behave in the same way. The E-step can therefore consider the blocks or chunks of data items via their representative statistics, rather than considering individual data items.

9 Claims, 7 Drawing Sheets

OTHER PUBLICATIONS

Hamdan; Mixture model clustering of binned uncertain data:the classification approach; Information and Communication Technologies 2nd, Apr. 2006, pp. 1645-1650.

Roberts et al.; Minimum-Entropy Data Partitioning Using Reversible Jump Markov Chain Monte Carlo; IEEE Transactions on Pattern Analysis and Machine Intelligence, Vol. 23, No. 8, Aug. 2001.

Boyd et al.; Convex Optimization; Cambridge University Press, 2004.

Bradley et al.; Scaling EM (expectation maximization) clustering to large databases; Technical Report MSR-TR-98-3, Microsoft Research, 1998.

Dasgupta; Learning mixtures of Gaussians; In FOCS, 1999.

Dempster et al.; Maximum likelihood from incomplete data via the EM algorithm,; Journal of the Royal Statistical Society, Series B, 39(1):1-38, 1977.

McLachlan et al.; Finite Mixture Models; Wiley Interscience, 2000.

Moore; A tutorial on kd-trees; Technical Report 209, University of Cambridge, 1991.

Moore; Very fast EM-based mixture model clustering using multiresolution kd-trees; In NIPS, 1999.

Neal et al.; A view of the EM algorithm that justifies incremental, sparse, and other variants; In Learning in Graphical Models, pp. 355-368, 1998.

Ortiz et al.; Accelerating EM: An empirical study; In UAI, 1999.

Thiesson et al.; Accelerating EM for large databases; Machine Learning, 45(3):279-299, 2001.

Verbeek et al.; A variational EM algorithm for large-scale mixture modeling; In ASCI, 2003.

Verbeek et al.; Accelerated EM based clustering of large data sets; Data Mining and Knowledge Discovery, 13(3):291-307, 2006.

* cited by examiner

E-step

160

162 — //Initialization
for all nodes $v \in \mathcal{V}$ in MPT $\mathcal{T}$ do
　　Initialize $K_v$, $C_v$, and $D_v$ as in (12)
end for 164 — //Collect-up
for all $v \in \mathcal{V}$; traversed bottom up, level by level do
　　if $v$ is a leaf $l \in \mathcal{L}$ then
　　　　Set pointer: $*\lambda_v = *\lambda_l$
　　else
　　　　Select $u \in ch(v)$ and set pointer: $*\lambda_v = *\lambda_u$
　　　　Update $K_v$ and $D_v$ as in (22) and (23)
　　end if
end for 166 — //Distribute-down and Finalize
for all $v \in \mathcal{V}$; traversed top down, level by level do
　　if $v$ is the root then
　　　　Set value $\lambda_v = \lambda_{l_v^*}$ as in (24)
　　else
　　　　Set value $\lambda_v = \lambda_{l_v^*}$ as in (20)
　　　　for all $k \in \mathcal{K}_v$ do
　　　　　　Compute $q_{B_k}$ as in (10) using (15).
　　　　end for
　　end if
end for

FIG. 4

R-step

190

> Initialize priority queue $Q$ favoring high $\Delta \mathcal{F}_{v,k}$ values.
> for each marked node $v$ in $\mathcal{T}$ do
>     Compute $q$ via E-step with constraints as in (27).
>     for all $k \in \mathcal{K}_v$ do
>         Insert candidate $(v, k)$ into $Q$ according to $\Delta \mathcal{F}_{v,k}$.
>     end for
> end for
> Select $K$ top-ranked $(v, k)$ in $Q$ for refinement.

214 — *Initialization*: build KD-tree, set initial MPT, set initial $\theta$, run E-step to set $q$, set $t, s = 0$, compute $\mathcal{F}_t, \mathcal{F}_s$ using (7)
repeat
    repeat
160 —     *E-step*: update $q$ using Algorithm 1
212 —     *M-step*: update $\theta$ using (25) and (26)
    Set $t \leftarrow t + 1$ and compute $\mathcal{F}_t$ using (7)
    until $(\mathcal{F}_t - \mathcal{F}_{t-1})/(\mathcal{F}_t - \mathcal{F}_0) < 10^{-4}$
190 —   *R-step*: refine partitions using Algorithm 2.
    Set $s \leftarrow s + 1$ and $\mathcal{F}_s = \mathcal{F}_t$
until $(\mathcal{F}_s - \mathcal{F}_{s-1})/(\mathcal{F}_s - \mathcal{F}_0) < 10^{-4}$

VARIATIONAL EM ALGORITHM FOR MIXTURE MODELING WITH COMPONENT-DEPENDENT PARTITIONS

BACKGROUND

Probabilistic mixture modeling is an important machine learning technique that has been extensively used for the tasks of density modeling and clustering. For clustering, individual mixture components represent the clusters. Mixture modeling is generally used for clustering data, such as media data, documents, signal data, scientific observations or measurements, etc. The Expectation-Maximization (EM) algorithm is among the most popular methods that are used for this task. The EM algorithm iteratively updates a model estimate until convergence. In practice, an iteration of the EM algorithm for mixture model clustering includes an E-step which, given a current model estimate, calculates cluster-membership probabilities for each data item in order to construct sufficient statistics, followed by an M-step which generates a new model estimate from those statistics. Each E-step has a computational complexity of $O(N*C)$, where N is the number of data cases (samples) and C is the number of mixture components (or clusters) in the model. For very large N and C, for example, Internet-scale data, the computational complexity of the EM algorithm can be prohibitive. Put another way, the EM algorithm does not scale well in N and does not scale well in C.

Techniques related to efficient variational EM mixture modeling are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Described are embodiments based on a variational Expectation Maximization (EM) framework, which alters the E-step by using component-dependent data partitions instead of individual data items. Consequently, the E-step is sublinear in sample size while these embodiments still maintain provable convergence guarantees.

The data items are organized into a hierarchical data structure comprised of nodes, where each node corresponds to a block of the data and stores statistics that represent the data items in the corresponding block. A coarse partition of the data items according to some level of granularity in the hierarchical data structure is assigned to each component (cluster) in the mixture model. These component-dependent partitions may be different for different components, and within a particular partition the block sizes may even be different. A version of the variational EM is then performed that constrains the cluster membership probabilities that are computed in the E-step such that all data items belonging to a particular block in a particular component-dependent partition behave in the same way. The E-step can therefore be performed by considering the blocks or chunks of data items via their representative statistics, rather than by considering individual data items. Following, the component-dependent partitions are selectively refined and the variational EM is again applied. This refinement process may continue until further refinements do not significantly change the clustering result.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Described herein are variants of the EM algorithm that scale well in N and C, have provable convergence guarantees, and have no additional parameters to set or tune beyond the limit of convergence. The EM variant approach described herein involves gradually refining component-dependent partitions while running the algorithm. More specifically, for a variational EM framework or basis, the variational distribution is constrained in a way that depends on the gradually refined data partition(s) into chunks (note that the variational distribution equals an approximation to the true optimal posterior cluster-membership probabilities for the data items): Chunks may also be referred to as blocks.

Prior approaches have described a variational EM algorithm for large-scale mixture modeling (see Verbeek et al., "A variational EM algorithm for large-scale mixture modeling", ASCI, 2003; and Verbeek et al., "Accelerated EM-based clustering of large data sets", Data Mining and Knowledge Discovery, 13(3):291-307, 2006). These approaches are also based on an application of the variational EM framework by Neal et al. ("A view of the EM Algorithm that justifies incremental, sparse, and other variants"). Within this framework, the variational distribution (approximation to true optimal solution) is constrained in a way that depends on the gradually refined data partition(s) into chunks. However, Verbeek's approach has all mixture components share the same data partition, which increases the computational load. Embodiments described herein extend this approach in a way that considers different data partitions for different mixture components in the model, yet within the variational EM framework. The approach improves how performance scales with respect to both N and C.

Figure 1:
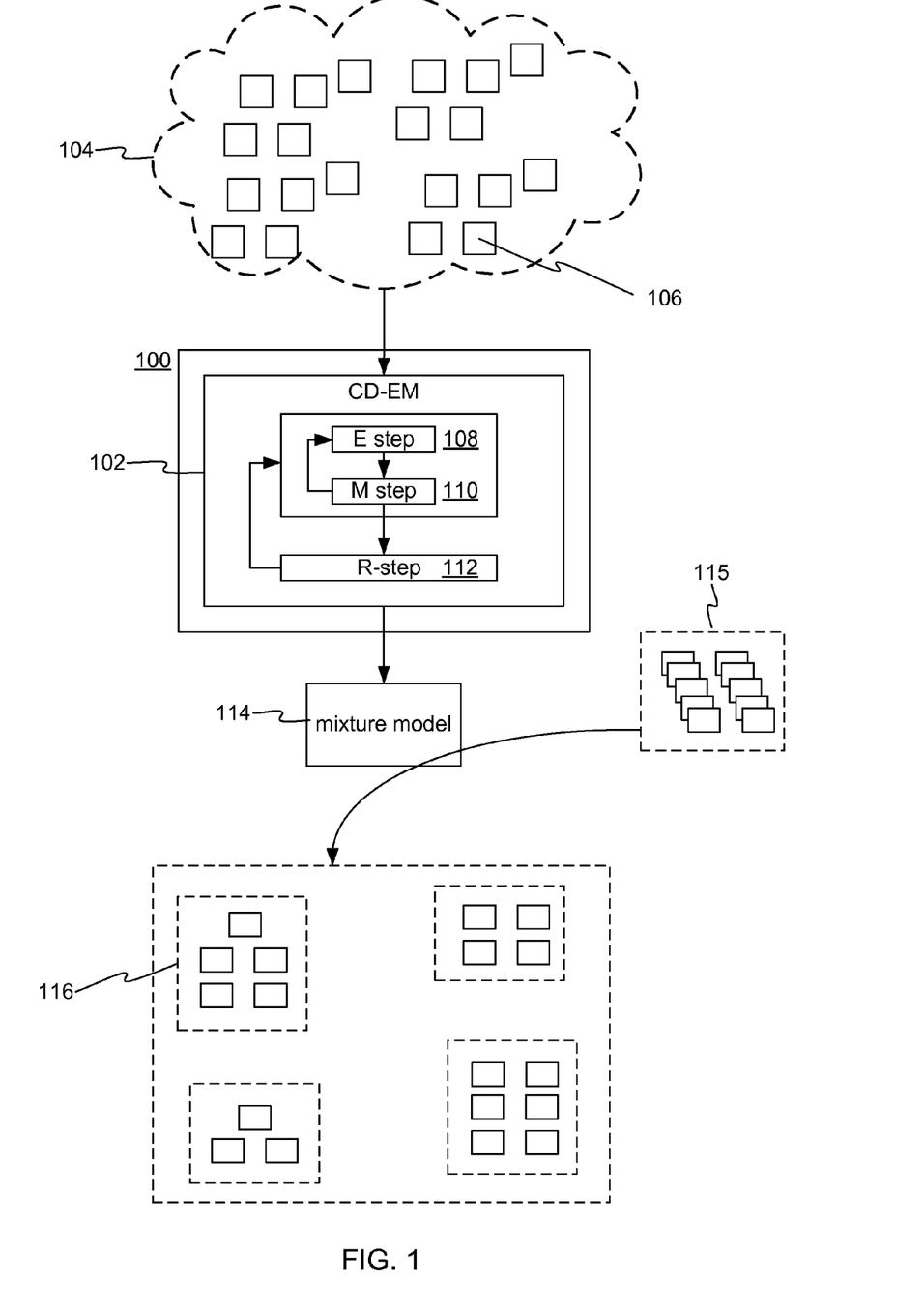
FIG. 1 shows a computing device running a program configured to perform a component-dependent EM (CD-EM) algorithm.

FIG. 1 shows a computing device 100 running a program 102 configured to perform a component-dependent EM (CD-EM) algorithm. The computing device 100 may in practice be a computer running the program 102 or a group of computers communicating by a network, backplane, bus, etc. to cooperatively execute the program 102 as a distributed application. An example computer is described with reference to FIG. 7. The program 102 receives or accesses a dataset 104 that includes a large number of data items 106. A data item 106 may be considered to be any piece of information stored in digital form on a computer.

Regarding the program 102 and the executing of machine or CPU instructions in accordance with the CD-EM algorithm, the original EM algorithm includes an E-step and an M-step (not to be equated with the E-step and M-step described here, which will sometimes be referred to as the CD E-step and the CD M-step). The CD-EM algorithm also has an E-step 108 and M-step 110, which will be described in detail below. The E-step 108 and the M-step 110 iterate as needed and then an R-step 112 is performed. The E-step 108 and M-step 110 loop with the R-step 112 until a stopping point is reached. The iterations continuously refine a mixture model 114, which can be used to cluster future data (as well as the data in 104 used to construct the model). For example, some ungrouped data 115 is processed by the mixture model 114 which forms clusters 116 of the data. It is to be understood that this clustering is probabilistic (or soft) in the sense that a data item is assigned with a fraction to each cluster rather than a hard assignment to just one cluster.

Figure 2:
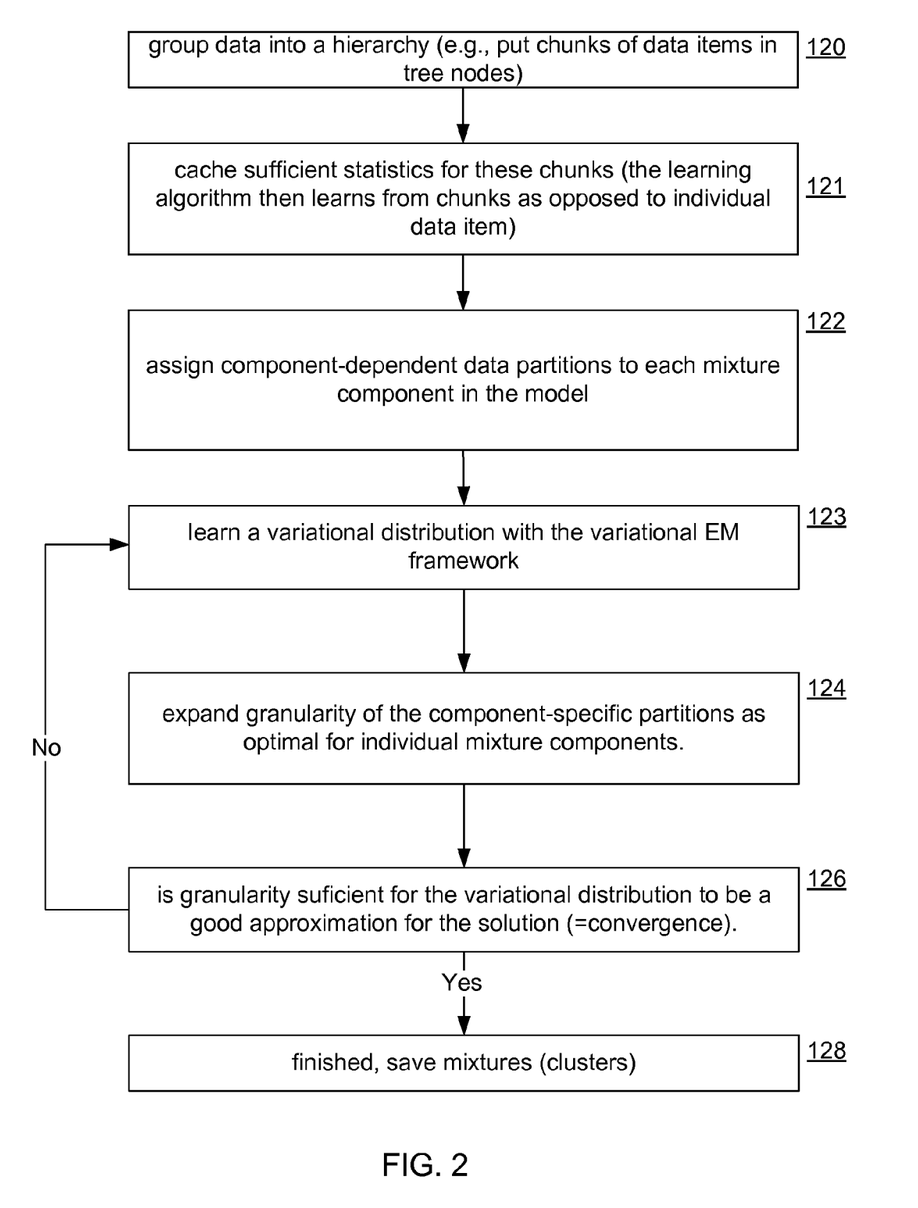
FIG. 2 shows a CD-EM algorithm embodiment.

FIG. 2 shows a CD-EM algorithm embodiment. The CD-EM algorithm performs the variational EM algorithm in a way that considers different partitions for different mixture components. First, the data items 106 in dataset 104 are grouped 120 into a hierarchical data structure. These groups will also be referred to as chunks. For example, the data items 106 may be divided into groups that are placed into the nodes of a KD-tree. Note that other types of hierarchies can be used, such as the data structure behind the spatial index in an SQL execution engine (e.g., an n-ary tree). Sufficient statistics are then cached 121 for each chunk. This will be described in detail below.

A coarse partition of the data items, according to some level of granularity in the hierarchical data structure, is assigned 122 to each component (cluster) in the mixture model, where these component-dependent partitions may be different for different components. Within a particular partition the block sizes may also be different. While any initial component-dependent partitions can be used, in one embodiment, initial component-dependent partitions can be selected to start with all component-dependent partitions similar to the coarsest level in the hierarchical data structure, which has at least as many nodes (or data blocks) as there are components in the mixture model.

Given the initial hierarchy with cached statistics, the variational EM framework (described below) is used to learn 123 a variational distribution of the data items 106. All data items 106 in a given chunk are treated as similar to each other when considering the associated mixture component. The granularity of the component-dependent partitions is selectively expanded 124 as optimal for individual mixture components.

If the granularity is sufficient 126 for the variational distribution to be a good approximation for the solution (that is, there is some convergence), then the process finishes 128 and the final mixture model and in some cases the final clustering for the data items used to train the model (the final results 114) are saved, stored to disk, transmitted by network, etc., for use in solving any real world problem represented by such data items. Otherwise, the learning 123 and expanding 124 are repeated as necessary. Given the stored or transmitted final results 114 (a mixture model trained according to the data items), any real world entities, scientific observations, database records, etc. similar to the data items may now be clustered and subject to analysis, decision making etc. using the saved final mixture model (final results 114). Media data represented by the data items may be indexed in a search engine based in part on the clustering information, and so on.

Tree-Consistent Partition

The number of possible partitions of a dataset of data items is super-exponentially large if no constraints are imposed. The partitions are therefore restricted by organizing the data items (to be referred to as "data" and "data points") using a tree structure, where a node in the tree represents the union of the data from its children. Individual data points are not actually stored in each node, but rather, sufficient statistics for estimation operations are pre-computed and stored in the nodes. A tree-consistent partition is any partition where each block of data corresponds to one node for a cut (possibly across different levels) in the tree (discussed below with reference to FIG. 3). Although the number of tree-consistent partitions is still exponentially large, the tree structure makes efficient search from coarse to fine partitions possible. Any hierarchical decomposition of data is suitable for constructing tree-consistent partitions. In one embodiment a KD-tree is used. A KD-tree is created in O(N log N) time, where N is the number of data points.

Variational EM

Given a set of independently and identically distributed data $x_\Delta \{x_1, \ldots, x_N\}$ (data items), a goal is to estimate the parameters $\theta = \{\eta_{1:K}, \pi_{1:K}\}$ in the K-component mixture model with log-likelihood function $$\mathcal{L}(\theta) = \Sigma_n \log \Sigma_k p(x_n | \eta_k) \pi_k. \quad (1)$$

For this task, a variational generalization of standard EM may be used, which maximizes a lower bound of $\mathcal{L}(\theta)$ through the introduction of a variational distribution q. It is assumed that that the variational distribution factorizes in accordance with data points, i.e, $q = \Pi_n q_n$, where each $q_n$ is an arbitrary discrete distribution over mixture components k=1, K. Note $\mathcal{L}(\theta)$ can be lower bounded by multiplying each $p(x_n | \eta_k) \pi_k$ with $$\frac{q_n(k)}{q_n(k)}$$

and by applying Jensen's inequality to get $$\mathcal{L}(\theta) \geq \sum_n \sum_k q_n(k)[\log p(x_n | \eta_k)\pi_k - \log q_n(k)] \quad (2)$$

$$= \mathcal{L}(\theta) - \sum_n KL(q_n \| p(\cdot | x_n, \theta)) \stackrel{\Delta}{=} \mathcal{F}(\theta, q), \quad (3)$$

where $p(\cdot | x_n, \theta)$ defines the posterior distribution of cluster-membership probabilities and $KL(q\|p)$ is the Kullback-Leibler (KL) divergence between q and p. The variational EM algorithm alternates the following two steps, i.e. coordinate ascent on $\mathcal{F}(\theta, q)$, until convergence.

E-step: $q^{t+1} = \arg\max_q \mathcal{F}(\theta^t, q)$,

M-step: $\theta^{t+1} = \arg\max_\theta \mathcal{F}(\theta, q^{t+1})$

If q is not restricted in any form, the E-step produces $q^{t+1} = \Pi_n p(\cdot | x_n, \theta^t)$ because the KL-divergence is the only term in equation (3) depending on q. As pointed out elsewhere, the variational EM is in this case equivalent to the standard EM, and hence produces the maximum likelihood (ML) estimate. In the following, certain ways of restricting q to attain speedup over standard EM will be considered, implying that the minimum KL-divergence between $q_n$ and $p(\cdot | x_n, \theta)$ is not necessarily zero. Still, the variational EM defines a convergent algorithm, which instead approximates the ML estimate by optimizing a lower bound on the log-likelihood.

Chunky EM

The chunky EM algorithm is a type of variational EM algorithm. The chunky EM algorithm is described by Verbeek et al. in "A variational EM algorithm for large-scale mixture modeling" (ASCI, 2003), and in "Accelerated EM-based clustering of large data sets" (Data Mining and Knowledge Discovery, (13(3):291-307, 2006). With the so-called chunky EM, the variational distribution $q=\Pi_n q_n$ is restricted according to tree-consistent partitions of the data. For a given partition, if data points $x_i$ and $x_j$ are in the same block, then $q_i=q_j$. The basis is that data points in the same block are somewhat similar and can be treated in the same way, which leads to computational savings in the computationally demanding E-step (further details are provided below in the section titled CD-EM: EFFICIENT VARIATIONAL E-STEP). In fact, if M is the number of blocks in a data partition, the E-step for chunky EM has cost O(KM), whereas in standard EM the cost is O(KN). The computational speedup can therefore be significant for M<<N.

The aforementioned speedup is traded off with tightness in the lower bound for the log-likelihood, according to restrictiveness of constraints on the variational distribution. To address this tradeoff, chunky EM starts from a coarse data partition and runs until convergence. The partition is then refined and the algorithm runs until convergence at a tighter lower bound. The hierarchical decomposition of partitions into a tree structure ensures that refinements will always produce a tighter bound, because restrictions on the variational distribution are gradually relaxed in this way. The refinement process, and hence chunky EM, stops when the refining of any partition will not significantly increase the lower bound.

Component-Dependent EM (CD-EM)

The remainder of this Detailed Description will describe the component-dependent EM approach. In chunky EM, all mixture components share the same data partition, regardless of whether they are far apart. However, the variation in membership probabilities for a component is greatest for data close to its center and insignificant far away. A computational speedup can be gained if component-dependent data partitions are created. Let $M_k$ be the number of data blocks in the partition for component k. The complexity for the E-step is then $O(\Sigma_k M_k)$, compared to O(KM) in chunky EM. The log-likelihood can be lower-bounded equally well with $\Sigma_k M_k$ significantly smaller than KM, resulting in a much faster E-step. Because the model maintains different partitions for different mixture components, it is referred to as the component-dependent EM algorithm (CD-EM).

CD-EM: Marked Partitioning Trees

For context and understanding, some properties of tree-consistent partitions will now be described. First, a marked partition tree (MPT) is defined as a simple encoding of all component-dependent partitions. Let $\mathcal{B}_k$ be the set of data blocks in the tree-consistent partition for mixture component k. In the shared data partition tree used to generate the component-dependent partitions, mark the corresponding nodes for the data blocks in each $\mathcal{B}_k$, by the component identifier k. The MPT is now obtained by pruning from the shared data partition tree all unmarked nodes without marked descendants.

Figure 3:
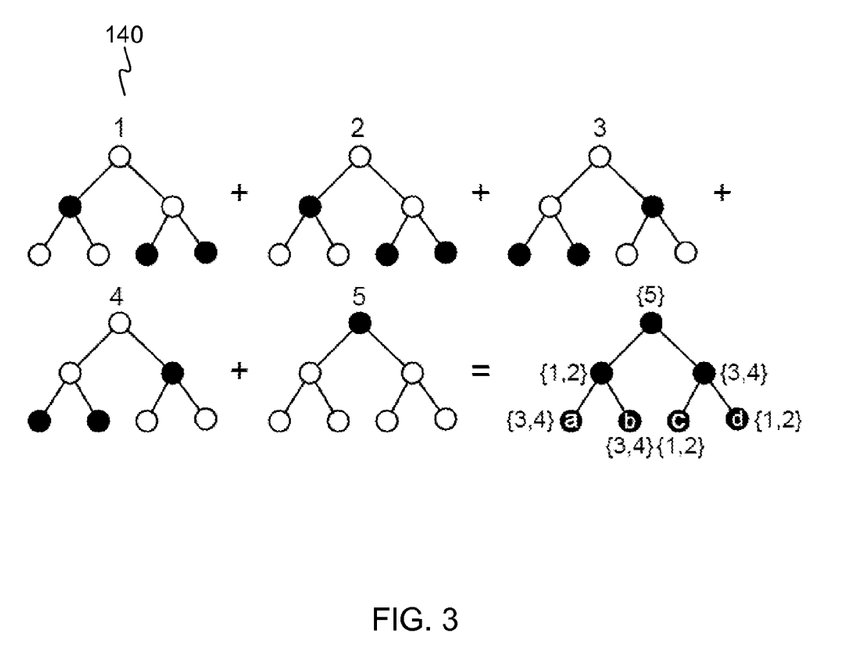
FIG. 3 shows a simple example of an MPT.

FIG. 3 shows a simple example of an MPT 140. Trees 1-5 represent 5 mixture components with individual partitions indicated by the black nodes. The bottom-right figure is the corresponding MPT 140, where {•} indicates the component marks and a, b, c, d enumerate the leaf nodes.

The example in FIG. 3 is of interest because all nodes in the tree are marked. In general, an MPT may have unmarked nodes at any location above the leaves. For example, in chunky EM, the component-dependent partitions are the same for each mixture component. In that case, only the leaves in the MPT are marked, with each leaf marked by all mixture components. The following property for an MPT holds true, due to the fact that all component-dependent partitions are constructed with respect to the same data partition tree:

Corollary 1. Let $\mathcal{T}$ denote a MPT. The marked nodes on a path from leaf to root in $\mathcal{T}$ mark exactly one data block from each of the K component-dependent data partitions.

CD-EM: Variational Distribution

Variational distribution q assigns the same variational membership probability to mixture component k for all data points in a component-dependent block $B_k \in \mathcal{B}_k$. That is, $$q_n(k) = q_{B_k} \text{ for all } x_n \in B_k, \quad (4)$$

which is denoted as the component-dependent block constraint. As opposed to chunky EM, it is not assumed that the data partition $\mathcal{B}_k$ is the same across different mixture components. This extra flexibility complicates the estimation of q in the E-step. Nevertheless, it will be seen that the estimation can still be performed in an efficient way.

Note that it should be ensured that for each data point, the optimized $q_n(\cdot)$ is a probability distribution. That is, $\Sigma_k q_n(k)=1$ and $q_n(k) \geq 0$. For now, discussion will focus on the sum-to-one constraints (in the CD-DM: EFFICIENT VARIATIONAL E-STEP section below, it will be seen that the positivity constraints are automatically enforced). Let $\mathcal{L}$ denote the leaves in $\mathcal{T}$, let $B_l$ denote the block of data associated with a leaf $l \in \mathcal{L}$, and let $B_{1(l)}, \ldots, B_{K(l)}$ denote the data blocks encountered on a specific path from a leaf $l \in \mathcal{L}$ to the root of $\mathcal{T}$. Hence, $B_{k(l)}$ is the data block $B_k \in \mathcal{B}_k$ for which $B_l \subseteq B_k$. With the component-dependent block constraints in equation (4) and using Corollary 1, the sum-to-one constraints can now instead be written as $|\mathcal{L}|$ constraints $$\Sigma_k q_{B_{k(l)}} = 1 \text{ for all } l \in \mathcal{L}. \quad (5)$$

Note that multiple $q_{B_{k(l)}}$ may represent the same $q_{B_k}$ across different constraints in equation (5). In fact, $$q_{B_{k(l)}} = q_{B_k} \text{ for } l \in \{l \in \mathcal{L} \mid B_l \subseteq B_k\} \quad (6)$$

implying that the constraints in equation (5) are intertwined according to a nested structure given by $\mathcal{T}$. The closer a data block $B_k$ is to the root of $\mathcal{T}$, the more constraints simultaneously involve $q_{B_k}$, which is what causes the additional complications in the E-step compared to chunky EM.

Referring again to FIG. 3 and the MPT 140 therein $$q_{B_{1(a)}} = q_{B_{1(b)}}, \; q_{B_{2(a)}} = q_{B_{2(b)}}, \; q_{B_{3(c)}} = q_{B_{3(d)}}, \; q_{B_{4(c)}} = q_{B_{4(d)}},$$
$$\text{and } q_{B_{5(a)}} = q_{B_{5(b)}} = q_{B_{5(c)}} = q_{B_{5(d)}}.$$

CD-DM: Efficient Variational E-Step

With the component-dependent block constraint on the variational distribution in equation (4), the lower bound $\mathcal{F}(\theta, q)$ can be reformulated as a sum of individual functions of $q_{B_k}, \mathcal{F}(\theta, q_{B_k})$, as follows. Rearranging equation (2) using equation (4):

$$\mathcal{F}(\theta, q) = \sum_k \sum_{B_k \in \mathcal{B}_k} |B_k| q_{B_k} [g_{B_k} + \log \pi_k - \log q_{B_k}] \quad (7)$$
$$= \sum_k \sum_{B_k \in \mathcal{B}_k} \mathcal{F}(\theta, q_{B_k}),$$

having defined the block-specific geometric mean $$g_{B_k} = \langle \log p(x \mid \eta_k) \rangle_{B_k} = \Sigma_{x \in B_k} \log p(x \mid \eta_k) / |B_k| \quad (8)$$

It is helpful to the computational savings that $g_{B_k}$ can be calculated from pre-computed statistics, which is in fact the case for the large class of exponential family distributions.

Example: Let $p(x|\eta_k)$ be an exponential family distribution $$p(x|\eta_k) = h(x)\exp(\eta_k^T T(x) - A(\eta_k)) \quad (9)$$

where $\eta_k$ is the natural parameter, $h(x)$ is the reference function, $T(x)$ is the sufficient statistic, and $A(\eta_k)$ is the normalizing constant. Then $g_{B_k} = \langle \log h(x) \rangle_{B_k} + \eta_k^T \langle T(\cdot) \rangle_{B_k} - A(\eta_k)$ where $\langle \log h(x) \rangle_{B_k}$ and $\langle T(\cdot) \rangle_{\triangleq B_k}$ are the statistics that are pre-computed for equation (8). In particular, if $p(x|\eta_k) = \mathcal{N}_d(\mu_k, \Sigma_k)$, a Gaussian distribution, then $$h(x) = T, T(x) = (x, xx^T), \eta_k = (\mu_k \Sigma_k^{-1}, -\Sigma_k^{-1}/2),$$

$$A(\eta_k) = (-\tfrac{1}{2})(d\log(2\pi) + \log|\Sigma_k| + \mu_k^T\Sigma^{-1}\mu_k),$$

and the statistics $\langle \log h(x) \rangle_{B_k} = 0$ and $\langle T(x) \rangle_{B_k} = (\langle x \rangle_{B_k}, \langle xx^T \rangle_{B_k})$ can be pre-computed.

The sum-to-one constraints in equation (5) are integrated into the lower bound in equation (7) by using the standard principle of Lagrange duality (see, e.g., Boyd and Vandenberghe, "L. Convex Optimization", Cambridge University Press, 2004.), $\mathcal{F}(\theta, q, \lambda) = \Sigma_k \Sigma_{B_k} \mathcal{F}(\theta, q_{B_{k(l)}}) + \Sigma_l \lambda_l (\Sigma_k q_{B_{k(l)}} - 1)$, where $\lambda \triangleq \{\lambda_1, \ldots, \lambda_L\}$ are the Lagrange multipliers for the constraints in equation (5). Recall the relationship between $q_{B_k}$ and $q_{B_{k(l)}}$ in equation (6). By taking the derivative of $\mathcal{F}(\theta, q, \lambda)$ with respect to $q_{B_k}$ and setting it to zero, obtain $$q_{B_k}(\lambda) = \exp\left(\frac{\sum_{l:B_l \subseteq B_k} \lambda_l}{|B_k|} - 1\right)\pi_k \exp(g_{B_k}). \quad (10)$$

The optimal value $q_{B_k}^* = q_{B_k}(\lambda^*)$ is now determined by solving the dual problem $\lambda^* = \arg\min_\lambda \mathcal{F}(\theta, q(\lambda), \lambda)$. Note that the expression in equation (10) ensures that $q_{B_k}(\lambda^*) \geq 0$, and therefore automatically satisfies the positivity constraint.

A particular simple situation appears in the setting of chunky EM, where $B_k = B_l$ for all $k=1, \ldots, K$. In this case, $\Sigma_{l:B_l \subseteq B_k} \lambda_l = \lambda_l$, and substituting equation (10) into the Lagrange dual function $\mathcal{F}(\theta, q(\lambda), \lambda)$ reveals that the optimization of $\lambda$ can be performed independently for each $\lambda_l$ as $\lambda_l^* = |B_l|(1 - \log \Sigma_k \pi_k \exp(g_{B_k}))$ Inserting this value back into equation (10) now presents a simple closed-form solution of the optimal variational distribution, $q_{B_k}^* = \pi_k \exp(g_{B_k})/Z$ where $Z = \Sigma_k \pi_k \exp(g_{B_k})$ is a normalizing constant.

This simple form of the optimization may is not possible when the partitions are allowed to be different across mixture components, because this setup creates intertwined constraints according to a nested structure given by $\mathcal{T}$, as shown above. However, a closed-form solution can still be obtained by carefully exploiting the nesting structure of the constraints.

Figure 4:
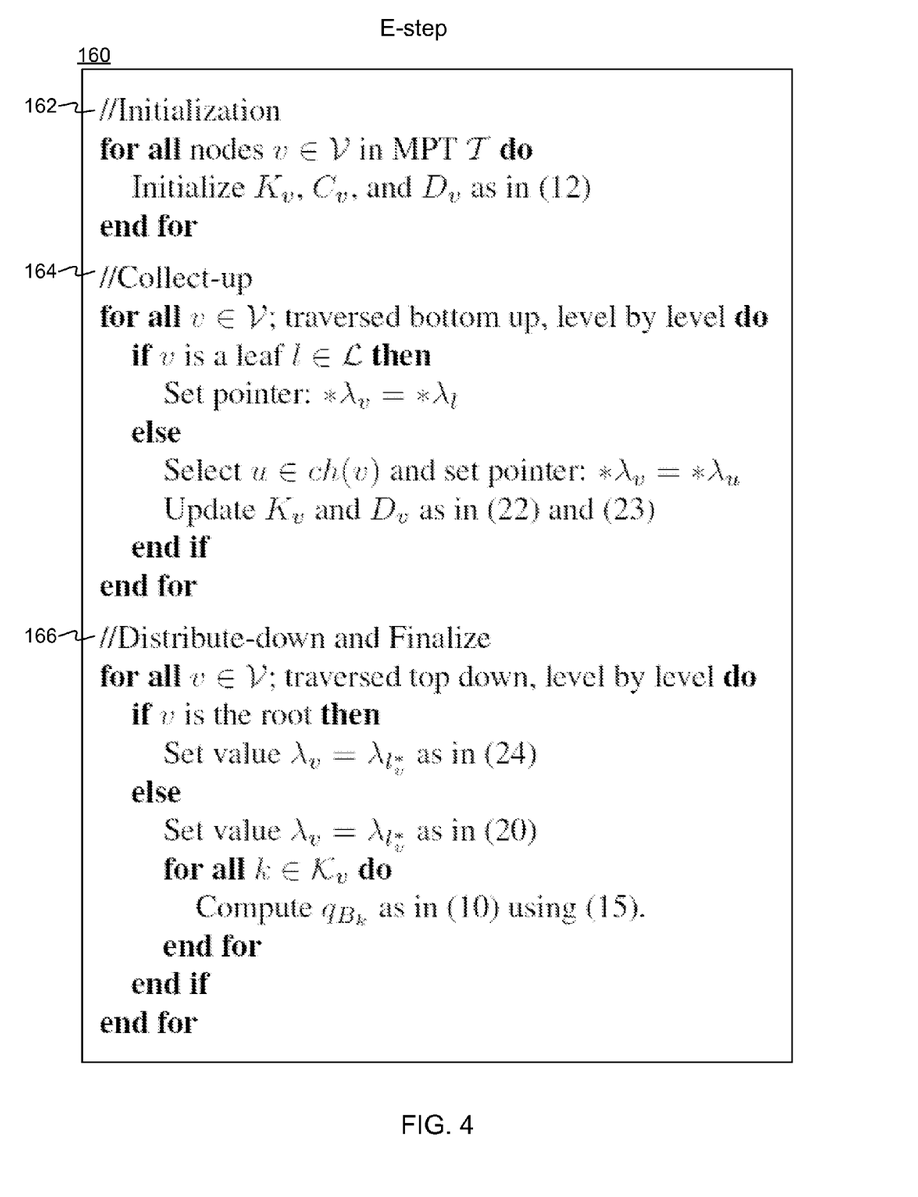
FIG. 4 shows an algorithm for performing a CD-EM E-step.

FIG. 4 shows an algorithm 160 for performing a CD-EM E-step. Algorithm 160 describes a general solution to the CD-EM E-step (i.e., how the q functions are optimized), which first traverses $\mathcal{T}$ bottom up, level by level and gradually reduces the nested constraints to a single equation involving only one $\lambda_l$. After solving this equation the algorithm now traverses $\mathcal{T}$ top down, level by level and gradually resolves the remaining Lagrange multipliers $\lambda_l$, $l \in \mathcal{L}$ by back-substitution of previously resolved $\lambda_l$. The resolved Lagrange multipliers can now be used to find the desired variational distribution q. The next corollary is useful for the detailed description of the individual steps in algorithm 160 that follows below.

Corollary 2. Let $i, i^* \in \{1, \ldots, I\}$.

If $$\exp\left(\frac{\lambda_i}{|B_i|} - 1\right)D_i = \exp\left(\frac{\lambda_{i^*}}{|B_{i^*}|} - 1\right)D_{i^*}$$

then, $$\lambda_i = |B_i|\left(\frac{\lambda_{i^*}}{|B_{i^*}|} + \log D_{i^*} - \log D_i\right).$$

Algorithm 160 has an initialization phase 162. The initialization phase 162 computes some initial statistics from the pre-computed sufficient statistics associated with the hierarchical data structure (e.g., in the nodes of the KD tree). For the initialization phase 160, let $\mathcal{V}$ denote the set of nodes in the MPT $\mathcal{T}$. When computing the solution for the variational distribution it is convenient to define three scalar values $K_v$, $C_v$ and $D_v$ (sufficient statistics) for each $v \in \mathcal{V}$ $K_v$. Initially, $$K_v = 0, \; C_v = \Sigma_{k \in \mathcal{K}_v} \pi_k \exp(g_{B_k}), \; D_v = C_v. \quad (12)$$

where $\mathcal{K}_v$ denotes the set of mixture components for which the set's data partition has a data block associated with node $v$. For each $v \in V$, define the node distribution $$q_v = \sum_{k \in K_v} q_{B_k} = \exp\left(\frac{\sum_{l:B_l \subseteq B_v} \lambda_l}{|B_v|} - 1\right)C_v \quad (13)$$

where the second equality follows from equations (10) and (12).

Algorithm 160 next performs a collect-up phase 164. The collect-up phase 164 traverses the tree $\mathcal{T}$ bottom up, level by level, where each step in this traversal considers a node v and its children $u \in \mathrm{ch}(v)$. The crux of the collect-up phase 164 is a manipulation of the parent-node distribution $q_v$ in such a way that the $\Sigma_{l:B_l \subseteq B_v} \lambda_l$ is replaced by a single $\lambda_l = \lambda_{l^*_v}$ of reference, where the index $1_{v^*}$ emphasizes that it is a reference-$\lambda$ that has been selected at node $v$. In particular, as described below, the collect-up phase will transform the representation in (13) into a representation $$q_v = \exp\left(\frac{\lambda_{l^*_v}}{|B_{l^*_v}|} - 1\right)C_v \exp\left(\frac{K_v}{|B_v|}\right) \quad (14)$$

by deriving the equality $$\sum_{l:B_l \subseteq B_v} \lambda_l = |B_v|\frac{\lambda_{l^*_v}}{|B_{l^*_v}|} + K_v \quad (15)$$

assuming a similar representation for each child-node distribution $q_u$, $u \in \mathrm{ch}(v)$. Note that node distributions at leaf nodes only involve one $\lambda$ and therefore trivially obey this condition, so traversal starts one level above. The transformation starts by the equality (recall that $u \in \mathrm{ch}(v)$, $$\sum_{l:B_l \subseteq B_v} \lambda_l = \sum_u \sum_{l:B_l \subseteq B_u} \lambda_l = \sum_u |B_u| \frac{\lambda_{l_u^*}}{|B_{l_u^*}|} + K_u \quad (16)$$

which implies that the $\Sigma_{l:B_l \subseteq B_v} \lambda_l$ involved in the parent-node distribution $q_v$ can be reduced to an expression involving just the $\lambda_{l^*_u}$ of reference for each of the |ch(v)| children. In order to transform equation (16) into one that involves only the single $\lambda_{l^*_v}$ of reference, the following procedure is applied.

Let $l \mapsto r$ denote the path of nodes $(l=w_1, w_2, \ldots, w_n=r)$ from leaf $l$ to root $r$ in $\mathcal{T}$, and let $w_i \mapsto w_j$, $1 \leq i, j \leq n$ denote a subpath of $l \mapsto r$. With the notation $q_{w_i \mapsto w_j} = \Sigma_{w \in w_i \mapsto w_j} q_w$, the constraints in equation (5) can be written as $$q_{l \mapsto r} = q_{l \mapsto u} + q_{v \mapsto r} = 1 \text{ for all } l \in \mathcal{L} \quad (17)$$

where $u \in ch(v)$ and $v \in \mathcal{V}$ are both on the path $l \mapsto r$. Since all children share the same path $v \mapsto r$ from their parent to the root, the constraints in (17) imply equality of all $q_{l \mapsto u}$, $u \in ch(v)$. In particular, we can ensure that for each $u \in ch(v)$ there exists a path, where the reference-$\lambda_s$ for all nodes on the path are the same. (E.g., we can always choose the reference-$\lambda$ associated with the left-Most child at each step in the traversal.) We can therefore construct $$q_{l_u^* \mapsto u} = \exp\left(\frac{\lambda_{l_u^*}}{|B_{l_u^*}|} - 1\right) D_u \quad (18)$$

where $$D_u = \sum_{w \in l_u^* \mapsto u} C_w \exp\left(\frac{K_w}{B_w}\right). \quad (19)$$

Thus, the condition for Corollary 2 is satisfied for all $q_{l_u^* \mapsto u}$, $u \in ch(v)$, which allows selection one of the $\lambda_{l^*_u}$ as the $\lambda_{l^*_v}$ and representation of each $\lambda_{l^*_u}$ as $$\lambda_{l_u^*} = |B_{l_u^*}|\left(\frac{\lambda_{l_v^*}}{|B_{l_v^*}|} + \log D_{u^*} - \log D_u\right), \quad (20)$$

where $u^*$ denotes the child with the chosen $\lambda_{l^*}{}^u = \lambda_{l^*}{}^v$ of reference. Substituting (20) into (16), gives $$\sum_{l:B_l \subseteq B_v} \lambda_l = \sum_u \left(|B_u|\left(\frac{\lambda_{l_v^*}}{|B_{l_v^*}|} + \log D_{u^*} - \log D_u\right) + K_u\right) \quad (21)$$

$$= |B_v|\frac{\lambda_{l_v^*}}{|B_{l_v^*}|} + |B_v|\log D_{u^*} + \sum_u (-|B_u|\log D_u + K_u)$$

$$\stackrel{\Delta}{=} |B_v|\frac{\lambda_{l_v^*}}{|B_{l_v^*}|} + K_v$$

which is the desired equality in equation (15) leading to the representation of $q_v$ as in equation (14) by substituting into equation (13). The algorithm is now ready for the next collect-up step in the collect-up phase 164.

A collect-up step 164 is summarized by the following updates $$K_v \leftarrow |B_v|\log D_{u^*} + \sum_u (-|B_u|\log D_u + K_u) \quad (22)$$

$$D_v \leftarrow C_v \exp\left(\frac{K_v}{|B_v|}\right) + D_{u^*} \quad (23)$$

which are induced from equations (21) and (19).

The algorithm 160 then performs a distribute-down phase 166. After a collect-up traversal, each node in $\mathcal{T}$ is associated with a particular reference-$\lambda$, and these reference-$\lambda$s are related as in equation (20). The distribute-down phase 166 traverses $\mathcal{T}$ top down, where each step uses the reference-$\lambda$ in the parent node to resolve the reference-$\lambda$s associated with its child nodes. Notice that the update is redundant for the particular child with reference-$\lambda$ chosen as the reference-$\lambda$ for the parent in the collect-up traversal, where, $\lambda_{l^*_u} = \lambda_{l^*_v}$. The root node starts the recursion and needs special treatment. The constraints in (17) imply that $$p l_r^* \mapsto r = \exp\left(\frac{\lambda_{l_r^*}}{|B_{l_r^*}|} - 1\right) D_r = 1,$$

which can be solved to obtain $$\lambda_{l^*_r} = |B_{l^*_r}|(1-\log D_r). \quad (24)$$

To finalize, with $\lambda_l$ available for all $l \in \mathcal{L}$, all $q_{B_k}$ can be determined by simply inserting the appropriate $\Sigma \lambda_l$ into equation (10). Alternatively, it is more efficient to update $q_{B_k}$ during each step in the distribute-down phase 166, since $\lambda_{l^*_v}$ is available at this point, and $\Sigma \lambda_l$ therefore can be computed using equation (15).

Finally, additional efficiency can be gained in the variational CD-EM E-step by cutting unmarked nodes (without marked ancestors) from the top of $\mathcal{L}$. We in this way create a forest of MPTs $\{\mathcal{L}_1, \ldots \mathcal{L}_k\}$. Each of these trees can now be treated independently during the estimation of the variational distribution, by noticing that (17) holds true in the root of each new tree, because $q_v=0$ for any unmarked node v in $\mathcal{L}$.

CD-DM: Efficient Variational M-Step

In the variational CD-EM M-step the model parameters $\theta=\{\eta_{1:K}, \pi_{1:K}\}$ are updated by maximizing equation (7) with respect to $\theta$ under the constraint $\Sigma_k \pi_k=1$. Hereby, the update is $$\pi_k \propto \Sigma_{B_k \in \mathcal{B}_k} |B_k| q_{B_k} \quad (25)$$

$$\eta_k = \arg\max_{\eta_k} \Sigma_{B_k \in \mathcal{B}_k} |B_k| q_{B_k} g_{B_k} \quad (26).$$

Notably, the model update in the CD-EM M-step can be efficiently computed, because the same pre-computed sufficient statistics used for updating the variational distribution in the CD-EM E-step can be used in the above update equations.

Example: If $p(x | \eta_k)$ has the exponential family form in equation (9), then the M-step update for $\eta_k$ is obtained by solving $$\eta_k = \arg\max_{\eta_k}\{\Sigma_{B_k \in \mathcal{B}_k} q_{B_k} \Sigma_{x \in B_k} T(x)\}\eta_k - \{$$
$$\Sigma_{B_k \in \mathcal{B}_k} |B_k| q B_k\} A(\eta_k).$$

In particular, if $p(x|\eta_k) = \mathcal{N}_d(\mu_k, \Sigma_k)$, then $$\Sigma_k = (\Sigma_{B_k \in \mathcal{B}_k} |B_k| q_{B_k} \langle x\, x^T \rangle_{B_k} - \mu_k \mu_k^T)/(N \pi_k).$$

CD-EM: Variational R-Step

Figure 5:
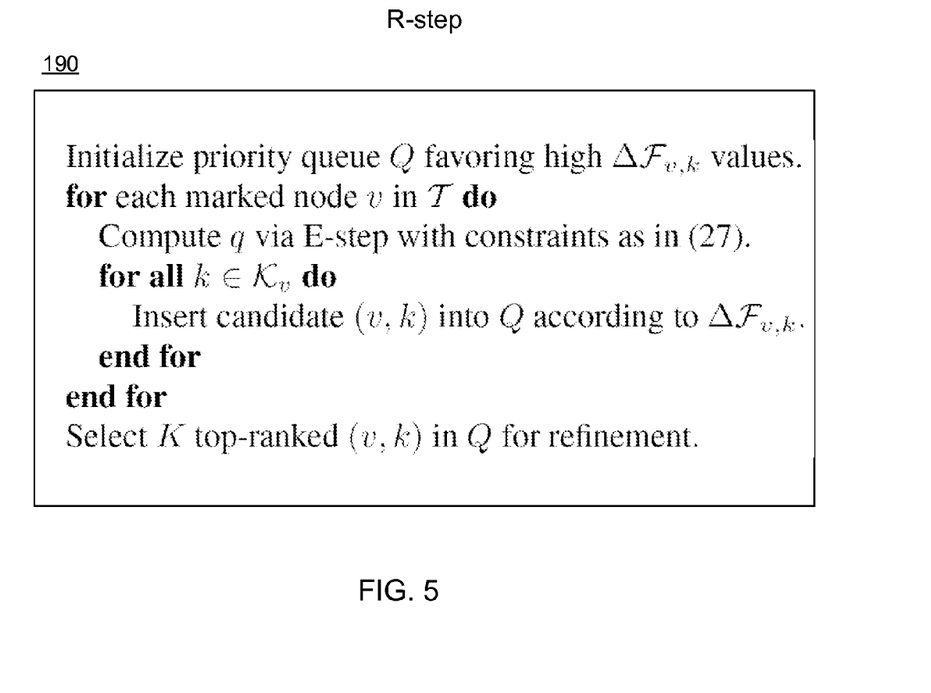
FIG. 5 shows a refining step (R-step) algorithm.

FIG. 5 shows a refining step (R-step) algorithm 190. Algorithm 190 shows a strategy for refining the partitions. Given the current component-dependent data partitions, represented by $\mathcal{T}$, the R-step selectively refines the partitions for some mixture components. Any R-step enlarges the family of variational distributions, and therefore the optimal lower bound for the log-likelihood obtained at the refined partitions is at least as tight as for coarser partitions. Hence, running variational EM after any R-step is guaranteed to increase the bound, as also shown in the CHUNKY EM section above. Regarding use of the priority queue refinement candidates (the queue elements) are inserted into the priority queue with priority according to their Delta-F score, as described below. At the end of the R-step, the K best candidates are chosen by obtaining from the queue the element that has the highest priority.

Refining one data block in a partition for one component will be considered to be a refinement unit. The overall efficiency of CD-EM is affected by the number of refinement units performed at each R-step. With too few units, too much time might be spent on refining, and with too many units, the choices might be too far from optimal and therefore might unnecessarily slow down the E-step. Empirical analysis has shown that K refinement units at each R-step is a balanced choice. The choice of K refinement units introduces K new free variational parameters, similar to a refinement step in chunky EM. However, in chunky EM the refinement units are evenly distributed across components, which is not the case with CD-EM.

Ideally, a CD-EM R-step should select the refinements leading to optimal improvement for $\mathcal{F}$. Candidates can be found by performing a single E-step for each candidate and then selecting refinements that most improve $\mathcal{F}$. Each of the $\Sigma_k M_k$ current data blocks is to be evaluated, thus the evaluation of each candidate should be efficient. However, the intertwined nature of the constraints on the variational distribution prevents local E-step computations, since all $q_{B_k}$s are tied together. As an approximation, consider the following local computation scheme based on the idea that refining a data block for a specific component mostly affects the $q_{B_k}$s with similar local block structure.

Recall that a data block in a partition is associated with a mark $k \in \mathcal{K}_v$ in a node $v \in \mathcal{T}$. Consider a marked node v in $\mathcal{T}$ and move all marks in v to its children (each child has a copy). Let $\tilde{\mathcal{T}}$ denote the altered MPT and $\tilde{\mathcal{K}}_u$ denote the set of marks for u, u∈ch(v). Now, update the variational distribution q under the following constraints $$\Sigma_{k \in \tilde{\mathcal{K}}_u} q_{B_k} + g_{rest} = 1 \text{ for all } u \in ch(v) \quad (27)$$

where $q_{rest}$ represents fixed values obtained for the components not in $\tilde{\mathcal{K}}_u$ before the refinement. Note that these constraints are not intertwined and the updated q can therefore be computed locally in closed form—as in equation (11)—with fixed $q_{rest}$. Finally, the improvement to $\mathcal{F}$ (denoted $\Delta \mathcal{F}_{v,k}$) that is used to rank the refinement candidates only involves the computation of $\mathcal{F}(\theta, q_{B_k})$ for the original and altered component-dependent data blocks in a refinement, so they can also be computed efficiently. Going through each marked node in the MPT $\mathcal{T}$ and computing candidate refinement improvements in this way will lead to a computational efficient ranking of all the candidate refinement units according to $\mathcal{T}$.

Overall Algorithm

Figure 6:
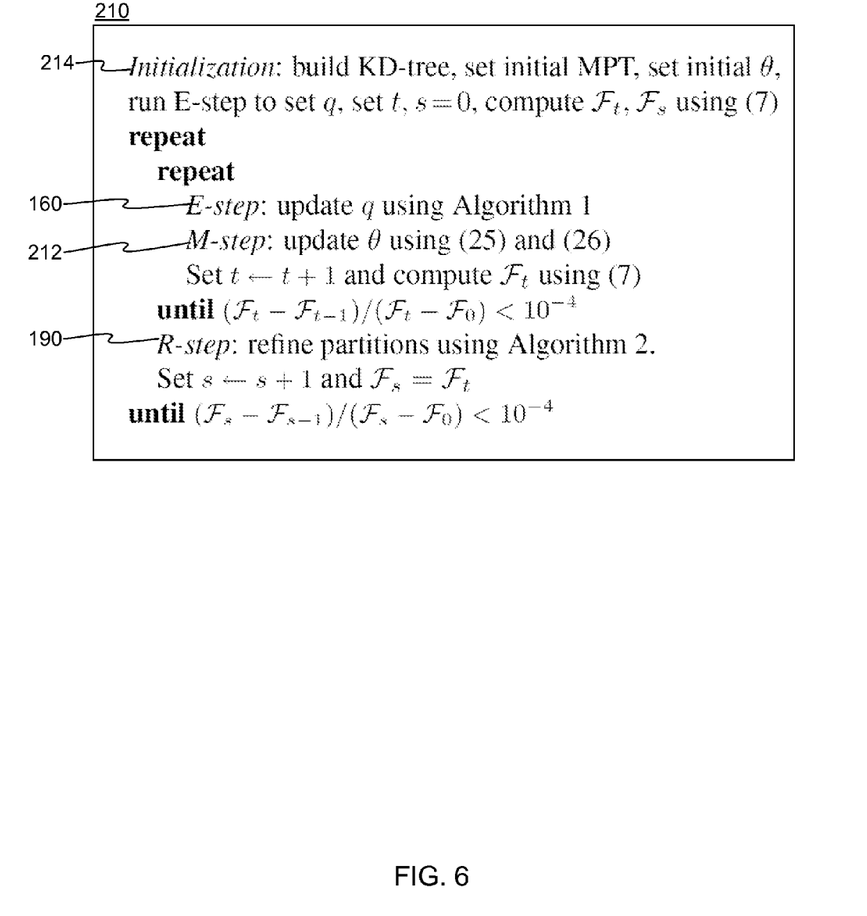
FIG. 6 shows a detailed CD-EM algorithm incorporating an E-step algorithm, an M-step, and an R-step algorithm.

FIG. 6 shows a detailed CD-EM algorithm 210 incorporating the E-step algorithm 160, the M-step 212, and the R-step algorithm 190. Starting initialization 214 from a coarse partition for each component, the CD-EM algorithm 190 runs variational EM to convergence. The component-dependent partitions are then selectively refined by moving the marks for some components downward in $\mathcal{T}$, and this process continues until the guaranteed convergence is achieved, and further refinements will not significantly improve the lower bound.

More specifically, from beginning to end, with algorithm 210, after the hierarchical data structure is initialized, component-dependent data partitions are formed. These component-dependent data partitions may be different for different mixture components. Then, given the component-dependent data partitions, a variational EM step is run (from the current parameter estimate) until convergence. Each E-step-M-step iteration includes the variational CD E-step, with computation of the approximating variational distribution that treats all data in a component-dependent data-chunk as similar for that mixture component. The CD E-step algorithm 160 provides scalability in both N and C, where C is the number of mixture components, and N is the number of data items. The variational CD M-step is then performed, which updates the current parameter estimate for the model based on the variational distribution computed in the CD E-step. The CD E-step and CD M-step are iterated until convergence. Then, the R-Step as shown in algorithm 190 is performed, which refines the component-dependent data partitioning. Unless convergence is reached, the CD E-step and CD M-step iteration is again repeated, and then the R-step is again performed.

Given the CD EM approach, any type of clustering task can be computed. For instance; email can be classified as spam, a set of environmental measurements can be used to classify a weather condition, a piece of data can be classified as belonging to a particular cluster (e.g., a document as coming from a particular author), and so on. Moreover, the approach will work well with a large training data set, and will also be scalable in the face of very large numbers of clusters (mixture components).

CONCLUSION

Figure 7:
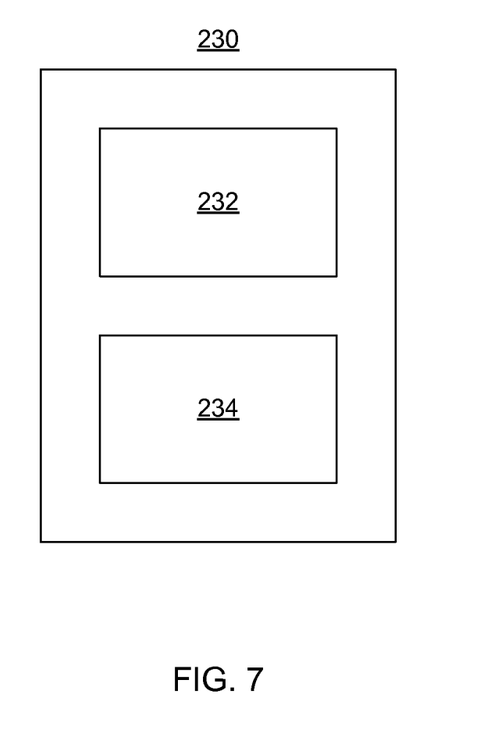
FIG. 7 shows a computer.

FIG. 7 shows a computer 230. The computer 230 may run any of the embodiments described, either in entirety or in part (e.g., in the case of distributed execution). The computer 230 may include some form of storage 232 working in cooperation with processor(s) 234. The storage 232 may include on-chip memory of processor(s) 234, recordable storage media, volatile memory, non-volatile memory, or any other current or future means for storing digital information in a form readily usable by a computer.

With the description above, one will be able to implement the embodiments and features discussed above using ordinary software development tools. The embodiments, as stored in storage 232, may take different forms such as machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of performing a variational EM algorithm on a computing device to compute a mixture model from data items in computer storage, the computing device comprising a processor and storage, the method comprising:

generating, by the processor, and storing in the storage, a hierarchical data partition of the data items;

initializing, by the processor, and storing in the storage, component-dependent data partitions of the data items in the hierarchical data partition that are specific to the mixture components, respectively, wherein each mixture component has its own respective different data partition;

performing, by the processor, a variational Expectation Maximization (EM) algorithm until convergence is determined, the performing comprising iteratively performing:

a variational E-step that computes, and stores in the storage, a variational distribution by treating all data in a given component-dependent data partition as similar for a given mixture component that corresponds to the given component-dependent data partition, wherein at least two of the component-dependent data partitions are different partitionings of the data items for different mixture components and are partially overlapping and partially non-overlapping; and a variational M-step where a current parameter estimate for the mixture model is stored in the storage and updated based on the variational distribution.

2. A method according to claim 1, wherein the performing of the variational EM algorithm further comprises a variational R-step that refines at least one of the component-dependent data partitions.

3. A method according to claim 2, wherein until convergence is reached, the following is performed iteratively: the variational E-step and the variational M-step are performed iteratively, and then the variational R-step is performed.

4. A method according to claim 3, wherein the variational E-step and the variational M-step are not run to convergence between performances of the R-steps.

5. A method according to claim 1, wherein generating the hierarchical data partitioning comprises computing a KD-tree or an n-ary tree, and where nodes of such a tree contain sufficient statistics of data items that correspond to the nodes.

6. A method according to claim 5 where the sufficient statistics are geometric means.

7. A method performed by one or more computing devices comprising a processor and storage, the method comprising:

performing, by the processor, a variational EM algorithm on a set of data items in the storage based on a mixture model comprised of mixture components in the storage, wherein the variational E-step of the variational EM algorithm is performed by the processor on component-dependent partitions of the data items in a hierarchical data structure, a given component-dependent partition comprising a partitioning of the data items where the data items that will be included in the given component-dependent data partition is dependent on a corresponding component of the mixture model such that each component-dependent data partition comprises a partitioning of the data items that is specific to a corresponding component.

8. A method according to claim 7, wherein the method begins with a coarse initialization of the component-dependent partitions.

9. A method according to claim 8, wherein, starting from initial component-dependent partitions, the following is repeated until convergence: the variational E-step and a variational M-step are repeated one or more times followed by an R-step.

* * * * *